Dec. 18, 1934. E. E. WEMP 1,985,127
POWER TRANSMITTING MECHANISM
Filed Nov. 5, 1931  3 Sheets-Sheet 1
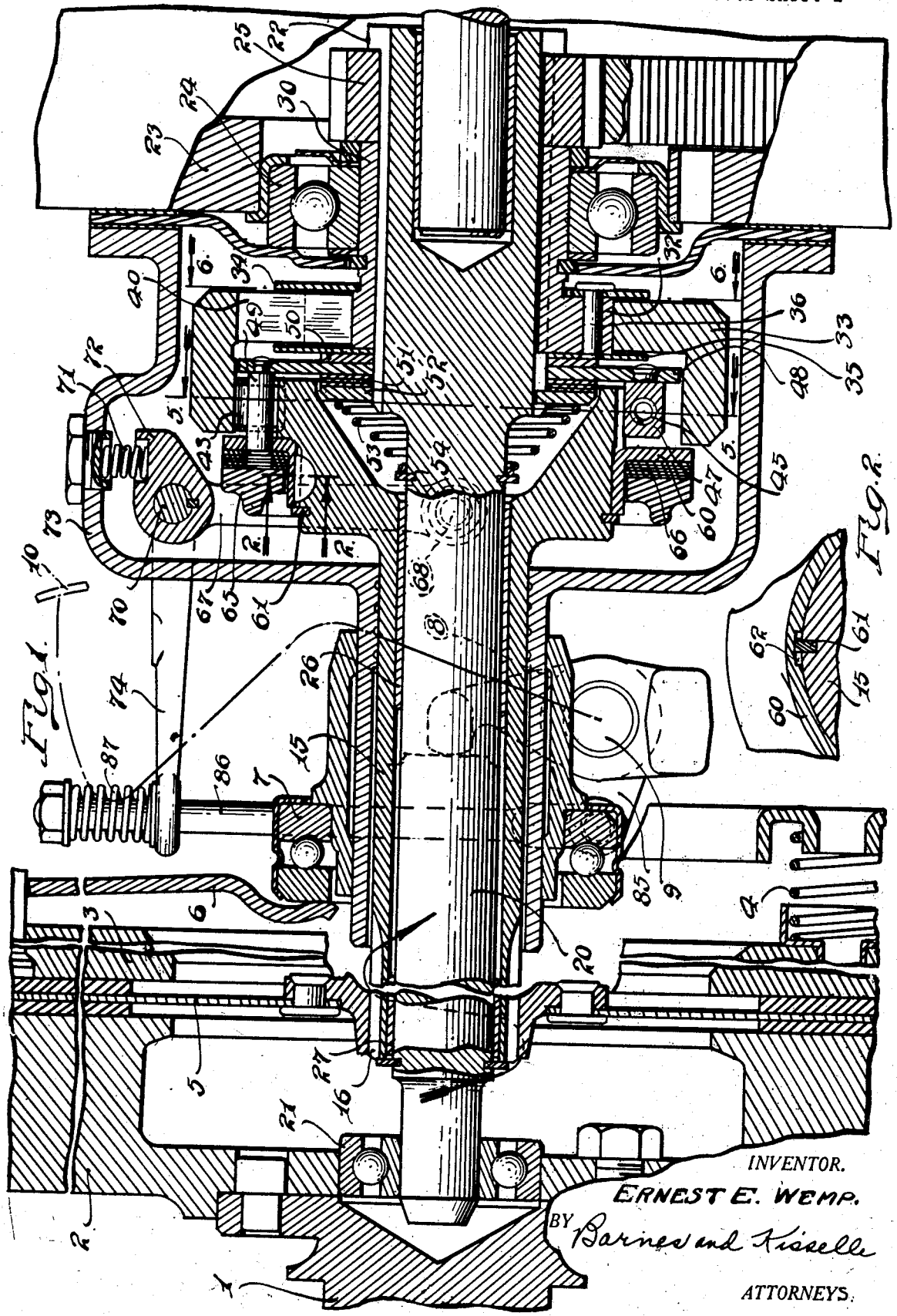
INVENTOR.
ERNEST E. WEMP.
BY Barnes and Kisselle
ATTORNEYS.

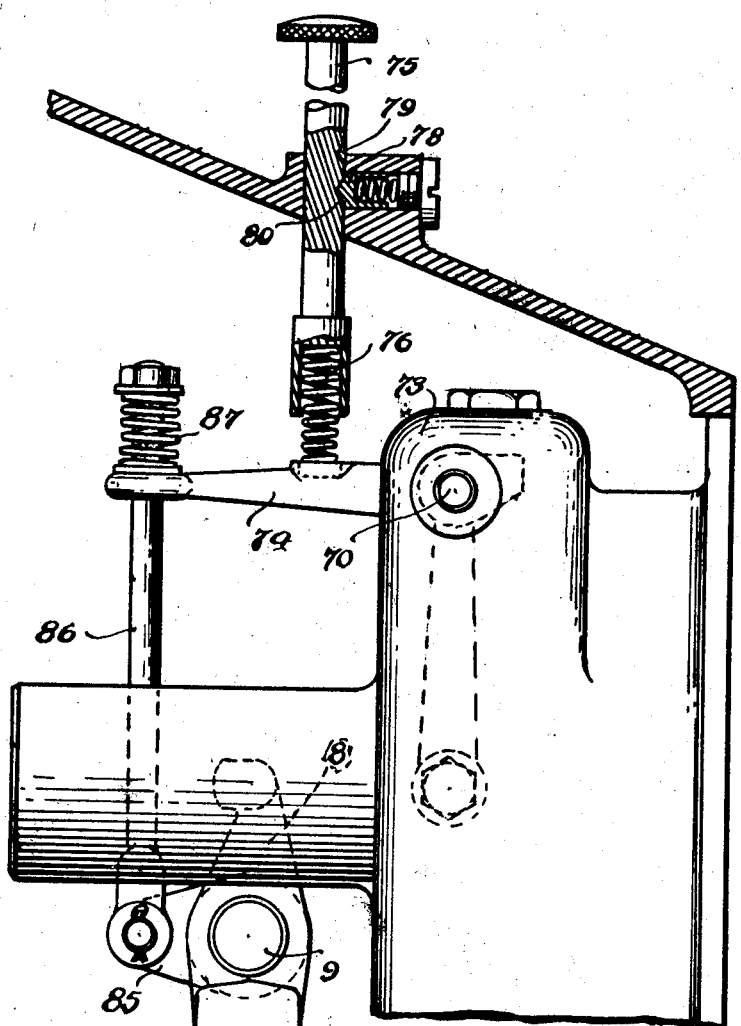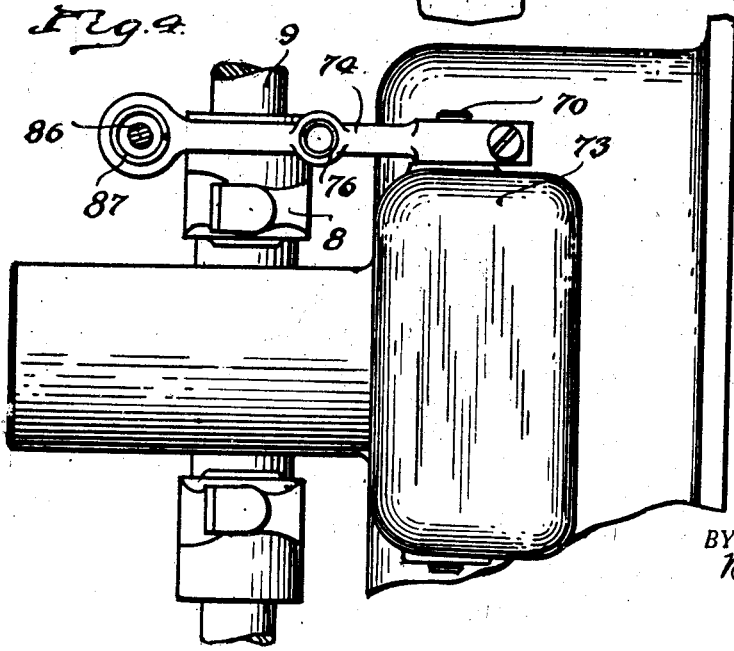

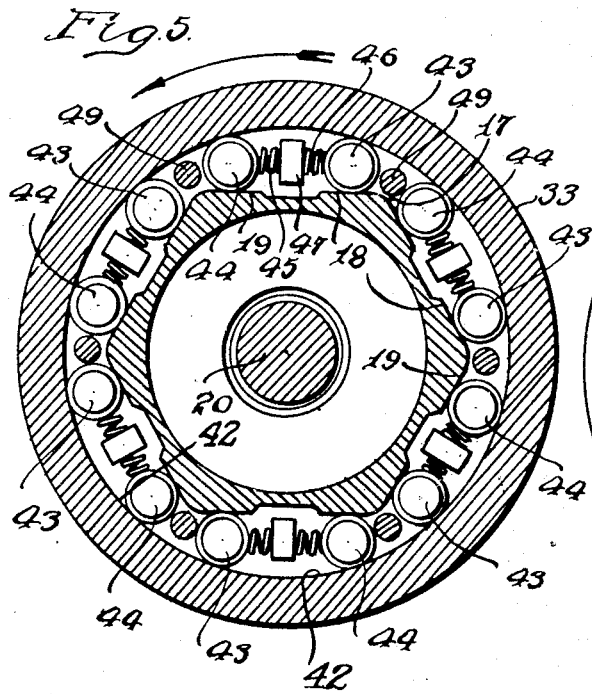
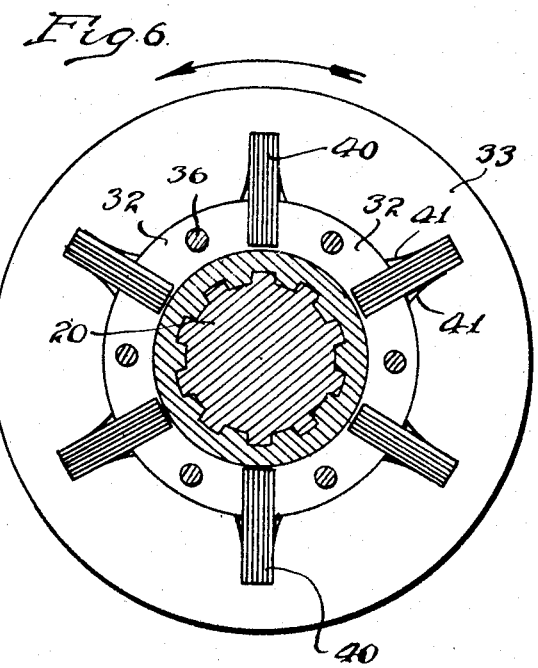
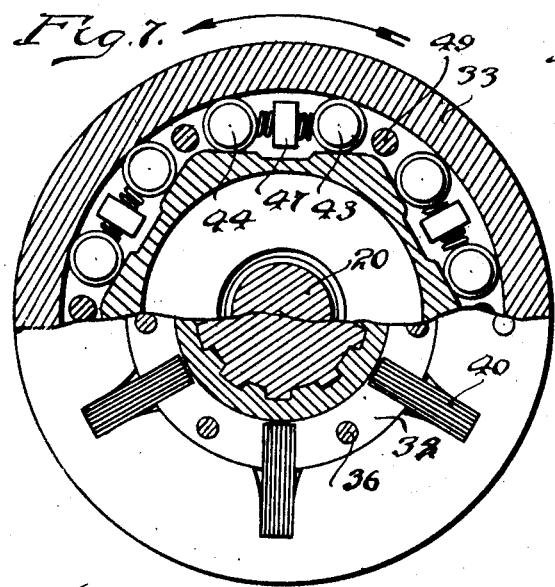
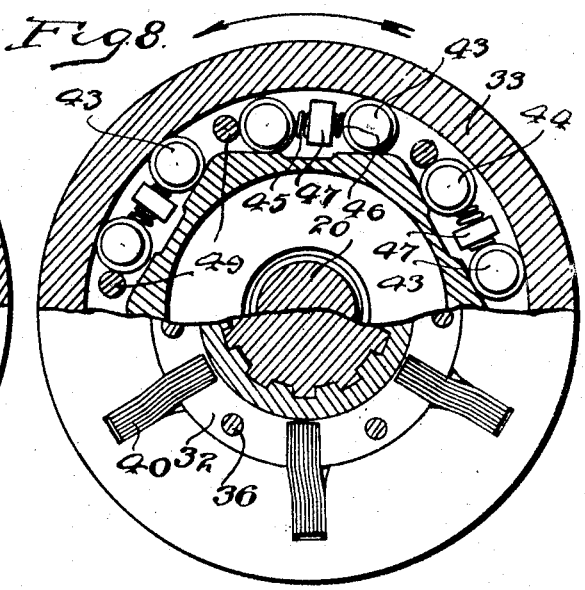
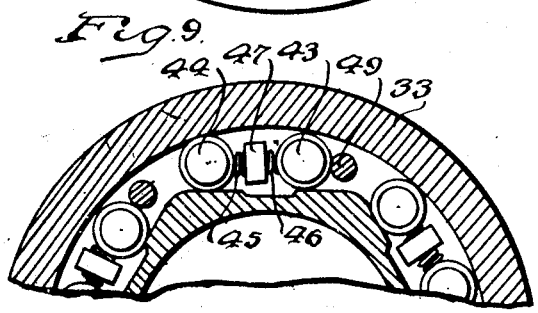
INVENTOR.
ERNEST E. WEMP.

Patented Dec. 18, 1934

1,985,127

UNITED STATES PATENT OFFICE 1,985,127

POWER TRANSMITTING MECHANISM

Ernest E. Wemp, Detroit, Mich.

Application November 5, 1931, Serial No. 573,115

12 Claims. (Cl. 192—48)

This invention has to do with mechanism for the transmission of power wherein driving and driven members may be operatively connected so that either may drive the other, and in which provision is made in the connecting mechanism to permit of the driven member to overrun the driving member.

Such structures are useful in automotive vehicles in providing for coasting or the overrunning of the vehicle with regard to the engine and parts associated therewith, wherein the vehicle may continue to travel at a relatively high rate of speed with the engine and associated parts decelerated to, or substantially to idling speed. This has been termed "free wheeling."

In such a structure, particularly an automotive vehicle, it is desirable to have the device under the control of the operator so that the overrunning action may be rendered effective or ineffective at will. One type of arrangement for accomplishing this overrunning action is a clutch embodying elements such as rollers positioned between driving and driven members in a groove or the like wherein the walls of the groove are shaped so as to cause the rollers to be wedged or jammed in between them and effect driving action in one direction, but in which the same rollers will not effect driving action when the torque is reversed. Heretofore, means employing parts for dental engagement with each other have been employed for establishing such a driving connection upon reverse torque when the rollers are ineffective. This is undesirable as it is often difficult to get the parts in proper alignment to effect dental engagement, particularly when the vehicle is being operated along a highway.

The present invention makes use of a roller type clutch, as above mentioned, for affording the overrunning action, and provides means for establishing a drive connection in elimination of the overrunning action without requiring a dental engagement. More specifically, the invention contemplates a roller clutch having two series of rollers, one series of which drives with the torque in one direction, and one series which drives with the torque reversed, together with means for rendering at least one set of the rollers ineffective at a time when they would otherwise establish a drive connection, thus affording an overriding action. Other objects of the invention will appear as the detail description progresses.

In the accompanying drawings:

Fig. 1 is a sectional view taken through structure exemplifying the invention showing also certain of the clutch parts including driving and driven members of an automotive vehicle.

Fig. 2 is an enlarged sectional detail taken on line 2—2 of Fig. 1.

Fig. 3 is a view in illustration of the housing for the structure and showing one form of control means.

Fig. 4 is a top plan view of the structure shown in Fig. 3 with the operable control element removed.

Fig. 5 is a section taken substantially on line 5—5 of Fig. 1.

Fig. 6 is a section taken substantially on line 6—6 of Fig. 1 showing the parts in inoperative condition.

Fig. 7 is a composite sectional view showing the parts illustrated in Figs. 5 and 6.

Fig. 8 is a view similar to Fig. 7 illustrating the relation of the parts in one condition of operation.

Fig. 9 is a sectional view showing parts in an operating condition different from that shown in Fig. 8.

The crank shaft of an internal combustion engine, or other engine, is shown at 1, having a flywheel 2; a clutch structure includes a pressure plate 3 acted upon by packing springs 4 for packing between pressure plate and flywheel a driven disk of the clutch, as shown at 5. This clutch may be released in the usual manner as by means of clutch releasing levers 6, operable to retract the pressure plate against the action of the springs 4. The details are not shown. The levers may be rocked by a releasing element 7, reciprocated by yoke arms 8 on a clutch releasing shaft 9 which in turn may be rocked as by means of a foot pedal 10. The foot pedal is shown diagrammatically so as to not confuse the other parts.

The driven disk is connected to a sleeve 15 as by means of a spline connection for driving the same. This sleeve is a driven member with respect to the clutch disk, but is a driving member with respect to other parts of the mechanism and will be so termed hereinafter. The sleeve 15 may be enlarged at its end remote from the disk 5 and suitably shaped for cooperation with clutch rollers. Such shape may embody high points 17 forming surfaces inclined to an arc taken around the center of rotation, such surfaces being shown at 18 and 19 and may be termed cam surfaces (Fig. 5).

A driven shaft is shown at 20, one end of which may be piloted in the flywheel as by means of a bearing 21, and the other end of which, as shown at 22, may extend to a gear shift housing or the like 23, journaled in a bearing 24. Within the housing the driven shaft may be equipped with a gear 25. This driven shaft is preferably journaled in the sleeve 15 for which purpose bearings 26 and 27 may be employed.

The sleeve 15 and driven shaft 20 are operatively connected together by the means of a roller clutch as will now be described. Fixed to the driven shaft as by means of a spline connection is a member in the form of a sleeve, as shown at 30, having a flange as at 32. A member 33 is fitted over the flange and may be held from axial displacement by rings 34 and 35 held by rivets or the like 36. The member 33 is rotatable upon flange 32 to a limited extent which is provided by flexible driving elements connecting these two members. The flange 32 may have a number of notches therein and the member 33 may have a similar number of matching notches in which flexible elements, as shown at 40, may be inserted. These flexible elements may extend radially and each may consist of a plurality of leaves such as spring steel. Some of the notches, as for example the notches in the member 33, may be widened at their mouth to form inclined walls 41 which permit of a limited degree of flexing or bending of the spring driving elements 40 while under load.

Member 33 projects over the enlarged end of the sleeve 15 and has an interior circumferential face, as shown at 42 (Fig. 5). Thus a circumferential groove is provided between the enlarged end of the shaft 15 and the interior surface 42, and in this groove clutch rollers are positioned. There are two series of rollers, one series being referenced 43, and the other series being referenced 44. The cam surfaces 18 are effective with one series of rollers, and cam surfaces 19 are effective with the other series of rollers. The series of rollers 44 are normally urged or jammed in between the surfaces 19 and surface 42 by springs 45, and the series of rollers 43 are likewise held urged against surface 42 and surfaces 18 by springs 46. The respective springs may be backed up by lugs 47 one of which may be positioned between each two opposing springs. These lugs may be carried by a plate or ring like member 48 (Fig. 1). The plate 48 may also carry studs 49 which project into the circumferential space, with one lug located between each two adjacent rollers, as shown in Fig. 5.

The plate 48 may be frictionally engaged between facing material 50 and 51 with the material 50 backed up by the member 30, and the material 51 pressed by a ring 52 acted upon by a spring 53. The spring in turn may be backed up by ring 54. This construction packs the plate 48 in between the frictional engaging elements 50 and 51.

The studs 49 may project through the circumferential space confining the rollers, and into apertures in a ring 60. This ring may be of angle formation in cross section and may be keyed to the member 15 by a key 61 preferably so that relative rotation to some extent may take place between members 15 and 60 for which purpose a relatively wide key-way 62 may be provided for the key.

It will be seen that the member 60 is designed to rotate in the operation of the parts, and means are provided for frictionally engaging the same. Such means may take the form of a control ring 65 arranged to engage facing material 66 which may be carried by the member 60. This control ring is shiftable to cause it to engage or release the facing material 66, for which purpose a yoke member 67 may be employed having its ends pivotally connected to ears (not shown) on the ring, as at the point 68, preferably located substantially in line with the axial center. The yoke member may be keyed to an operating shaft 70 and it may be held so that ring 65 is normally disengaged from the material 66 by the action of a coil spring 71 functioning upon an arm of the yoke member, as at 72. All the structure thus described, or substantially all of it, may be confined in a housing, such as housing 73 and the rocker shaft 70 may project outside the housing, where an arm 74 is fixed thereto so that it may rock the same. As shown in Fig. 3, the arm 74 may be rocked by means of a manually controlled element 75 operatively associated with the arm 74 through the means of a spring 76. The member 75 may be held in one of two positions as by means of a spring pressed plunger 78 cooperating with notches 79 and 80 in the member 75. When the member 75 is raised, as is shown in Fig. 3, the arm 74 may rock clockwise under action of spring 71 and position the control ring 65 out of engagement with material 66. When the control member 75 is depressed to engage the plunger 78 in notch 79 the arm 74 is rocked so as to cause the control ring to engage the material 66.

Advantageously the control ring may be caused to function as the usual friction clutch, constituted by parts 2, 3 and 5, is released and engaged, for which purpose the clutch-releasing shaft 9 may have an arm 85 connected by a link 86 and the arm 74 as by means of the link passing through an apertured end of the arm and engaging the same through the means of a spring 87. When the clutch is released, as by rocking the shaft 9 counterclockwise (Fig. 3), the arm 74 is similarly rocked, and the control ring 65 caused to engage friction material 66. This occurs automatically. When the clutch is reengaged the control ring 65 again moves to disengage the facing material 66 under the action of spring 71. This actuation of the control ring 65 occurs only when the element 75 is positioned so that the control ring is out of engagement normally with the friction material 66; if the control element 75 be shifted from the position shown in Fig. 3 to cause the control ring 65 to frictionally engage the facing material 66, then no actuation of the control ring takes place upon clutch release and reengagement.

The operation is as follows: let it be assumed that the ring 65 is out of engagement with the material 66. Upon initial rotary action of the driving member 15 in a direction counterclockwise as Fig. 5 is viewed, the rollers 43 effect a driving connection between the driving member 15 and the member 33. Due to the load on the driven shaft 20 the spring elements 40 flex as member 33 tends to drive member 30. This spring flexure is illustrated in Fig. 8. This results in the member 30, as well as driven shaft 20, lagging behind the member 33, the member 15 and the clutch rollers. This lag also takes place in the plate 48 as it is engaged between frictional elements which move with the driven shaft and sleeve 30. The result is that the pins 49 lag behind or remain substantially stationary for an instant after rotation starts in the driving and driven clutch members and rollers. Accordingly, the rollers 44 and pins 49 approach each other, and the pins move the rollers against the action of springs 45 compressing said springs as shown in Fig. 8. The rollers 44 are now ineffective. By this same token the studs 47 carried by the plate 48 shift and compress springs 46 thus more tightly jamming rollers 43 into operating relation as between the driving and driven parts of the clutch. The parts may continue operation in this position as long as the torque is in a direction from the driving member 15 to the driven shaft 20. Assume now that the driven shaft tends to overrun. In this action the driven shaft tends to drive member 33 through the flexible elements 40, and the flexible elements are flexed reversely to that shown in Fig. 8 resulting in a lag of the driven clutch member 33, the driving clutch member and clutch rollers relative to shaft 20. The pins 49 move with the driven shaft thereby shifting from the position shown in Fig. 8 to the position shown in Fig. 9 thus acting upon the rollers 43, compressing the springs and rendering these rollers ineffective and releasing rollers 44 so that they now establish a drive between driven and driving members with the torque reversed.

Consider again the operation of the structure from a position of rest, the member 75 having been actuated to engage the control ring 65 with friction material 66. As soon as the driving member 15 starts to rotate the driven members 20 and 30 lag behind, as heretofore described, so that this time the control ring 65 merely works with and aids such lag to the end that the parts take the position substantially as shown in Fig. 8. Now when the torque reverses, the tendency is for the pins 49 to shift from the position shown in Fig. 8 to that shown in Fig. 9, but the frictional engagement between the control ring 65 and friction material 66 has a greater torque capacity than the frictional engagement of plate 48 with members 50 and 51. Accordingly, slippage occurs between plate 48 and members 50 and 51 to the end that the studs 49 do not shift but remain substantially in the position illustrated in Fig. 8. The result is that the driven parts, including member 33, may overrun the driving parts, as it will be appreciated by reference to Fig. 8, rotating in counterclockwise direction faster than the driving member 15. This is the free wheeling or overrunning action.

Any time the operator desires to eliminate the free wheeling action the control ring 65 may be disengaged from facing 66; any time the overrunning action is desired, the control ring 65 may be rendered effective. When the parts are rotating the control ring, when rendered effective, immediately exerts a decelerating tendency on the studs to shift them if they are not already shifted, and for holding them substantially in the position shown in Fig. 8. This may be accomplished without in any way requiring the operator to synchronize the rotating parts to effect dental engagement.

The clutch constituted by parts 2, 3 and 5, and associated parts may be disengaged by rocking shaft 9 counterclockwise, viewing Fig. 1. Each time the clutch is disengaged the arm 74 is rocked and the ring 65 rendered effective automatically, thus causing the clutch parts to take a free wheeling position. As is the usual practice the clutch is to be released for shifting gears when the overrunning action is not effective. Gear shifting is facilitated when the polar inertia of the freely rotating parts is minimized; and the automatically cutting in of the overrunning action reduces such polar inertia. In other words, when the clutch is disengaged, the driving member 15 and parts carried thereby together with the driven disk 5 of the main clutch, are disconnected from the driven shaft 20 which extends into the transmission, and this disconnecting reduces the polar inertia to the extent of cutting out these parts. Thus, every time a gear shift is made the gears in the transmission are free to overrun irrespective of whether or not at the moment the parts are set for overrunning action or positive drive action.

The elements 43 and 44 herein have been termed "rollers" both in the specification and in some of the claims. The elements are shown in the form of cylindrical rollers, but it is to be understood that this term is used broadly as indicating a rolling element whether it be cylindrical, in the shape of a ball, or a tapered roller.

I claim:

1. The combination of a driving member including a driving clutch part, a driven clutch part, a driven member, flexible connecting means between the driven clutch part and driven member for transmitting the entire load from said part to said member for permitting the driven member to lag behind said driven clutch part when torque is applied in one direction, and the driven clutch part to lag behind the driven member upon torque reversal, a set of clutching rollers for clutching the clutch parts with torque in one direction, another set for clutching the clutch parts with torque reversed, means operable incident to the lag action for rendering some of the rollers ineffective, and control means operable at will for maintaining one set of rollers ineffective.

2. The combination of a driving member including a driving clutch part, a driven clutch part, a driven member, a plurality of flexible elements between the driven clutch part and driven member for permitting the driven member to lag behind said driven clutch part when torque is applied in one direction, and the driven clutch part to lag behind the driven member upon torque reversal, a set of clutching rollers for clutching the clutch parts with torque in one direction, another set for clutching the clutch parts with torque reversed, means operable incident to the lag action for rendering ineffective when torque is from driving member to driven member, the set of rollers adapted to effect clutching action when the torque reverses, and means controllable at will for maintaining said set of rollers ineffective when the torque reverses.

3. The combination of a driving member including a driving clutch part, a driven clutch part, a driven member, a plurality of radially extending flexible driving elements between the driven clutch part and driven member for permitting the driven member to lag behind said driven clutch part when torque is applied in one direction, and the driven clutch part to lag behind the driven member upon torque reversal, a set of clutching rollers for clutching the clutch parts with torque in one direction, another set for clutching the clutch parts with torque reversed, means operable incident to the lag action for rendering ineffective when torque is from driving member to driven member, the set of rollers adapted to effect clutching action when the torque reverses, and means controllable at will for maintaining said set of rollers ineffective when the torque reverses.

4. The combination of a driving member including a driving clutch part, a driven clutch part, a driven member, a plurality of spring driving elements between the driven clutch part and driven member for permitting the driven member to lag behind said driven clutch part when torque is applied in one direction, and the driven clutch part to lag behind the driven member upon torque reversal, a set of clutching rollers for clutching the clutch parts with torque in one direction, another set for clutching the clutch parts with torque reversed, means operable incident to the lag action for rendering ineffective when torque is from driving member to driven member, the set of rollers adapted to effect clutching action when the torque reverses, and means controllable at will for maintaining said set of rollers ineffective when the torque reverses.

5. The combination of a driving member including a driving clutch part, a driven clutch part, a driven member, a plurality of radially extending leaf spring driving elements between the driven clutch part and driven member for permitting the driven member to lag behind said driven clutch part when torque is applied in one direction, and the driven clutch part to lag behind the driven member upon torque reversal, a set of clutching rollers for clutching the clutch parts with torque in one direction, another set for clutching the clutch parts with torque reversed, means operable incident to the lag action for rendering ineffective when torque is from driving member to driven member, the set of rollers adapted to effect clutching action when the torque reverses, and means controllable at will for maintaining said set of rollers ineffective when the torque reverses.

6. The combination of a driving member including a driving clutch part, a driven clutch part, a driven member, the driven clutch part and the driven member having radially aligned notches, a spring driving element located in each pair of aligned notches in the driven clutch part and driven member for permitting the driven member to lag behind said driven clutch part when torque is applied in one direction, and the driven clutch part to lag behind the driven member upon torque reversal, a set of clutching rollers for clutching the clutch parts with torque in one direction, another set for clutching the clutch parts with torque reversed, means operable incident to the lag action for rendering ineffective when torque is from driving member to driven member, the set of rollers adapted to effect clutching action when the torque reverses, and means controllable at will for maintaining said set of rollers ineffective when the torque reverses.

7. The combination of a driving member including a driving clutch part, a driven clutch part, a driven member, the driven clutch part and driven member having each a plurality of notches with the notches in the part and member arranged in pairs, a spring element located in each pair of aligned notches, the walls of the notches in at least one member being inclined whereby the mouths of said notches are widened, said springs flexing under load for permitting the driven member to lag behind said driven clutch part when torque is applied in one direction, and the driven clutch part to lag behind the driven member upon torque reversal, a set of clutching rollers for clutching the clutch parts with torque in one direction, another set for clutching the clutch parts with torque reversed, means operable incident to the lag action for rendering ineffective, when torque is from driving member to driven member, the set of rollers adapted to effect clutching action when the torque reverses, and means controllable at will for maintaining said set of rollers ineffective when the torque reverses.

8. The combination of a driving member including a driving clutch part, a driven clutch part, a driven member, the driven clutch part and driven member having notches aligned in pairs, spring elements located in the notches forming a flexible drive between the clutch driven part and driven member adapted to flex under torque whereby to permit of a lag action as between the clutch driven part and driven member, clutching elements for clutching the clutch driving and driven parts together with torque in one direction, clutching elements for clutching said parts together with reverse torque, means operable incident to said lag action for rendering some of the clutching elements ineffective, and means controllable at will for maintaining said clutching elements ineffective whereby the driven member may overrun the driving member.

9. The combination of a primary clutch, control means for releasing and engaging said clutch, a member rotated by said clutch when engaged having a clutch driving part for a secondary clutch, a secondary driven clutch part, a driven member, means connecting the secondary driven clutch part and driven member, clutching elements between the secondary clutch parts for establishing a drive connection with torque in one direction, other clutching elements for establishing a drive when the torque is reversed, means controllable at will for rendering one set of clutching elements ineffective when the torque is from the driven part of the secondary clutch to the driving part thereof, and connections between said last mentioned means and the control means for the primary clutch for rendering said clutching elements ineffective upon operation of the said control means to release the primary clutch.

10. The combination of a primary clutch, control means for releasing and engaging the same, a member driven by the primary clutch having a driving part of a secondary clutch, a driven part for the secondary clutch, a driven member, means connecting said driven member with the driven part of the secondary clutch, clutching elements between the driving and driven parts of the secondary clutch, some for establishing a driving connection when the torque is from driving part to driven part, and some for establishing clutching action when the torque is reversed, means for rendering the clutching elements ineffective which are adapted to effect clutching action when the torque is reversed, and connections between said means and the control means of the primary clutch whereby upon release of the primary clutch said clutching elements are automatically rendered ineffective.

11. The combination of a primary clutch, control means for releasing and engaging the same, a member driven by the primary clutch having a driving part of a secondary clutch, a driven part for the secondary clutch, a driven member, means connecting said driven member with the driven part of the secondary clutch, clutching elements between the driving and driven parts of the secondary clutch, some for establishing a driving connection when the torque is from driving part to driven part, and some for establishing a driving connection when the torque is reversed, means for rendering the clutching elements ineffective which are adapted to effect clutching action when the torque is reversed, connections between said means and the control means for the primary clutch whereby upon release of the primary clutch said clutching elements are automatically rendered ineffective, and additional means controllable at the will of the operator for maintaining the said clutching elements ineffective, independently of the control means for the primary clutch.

12. The combination of a driving member, a driven member, the members being arranged to provide a circumferential groove, clutching rollers in the groove, means effective on some of the clutching rollers for establishing a driving connection when the torque is from driving member to driven member, and effective upon other rollers when the torque is reversed, a driven shaft, a flexible connection between the driven member and driven shaft arranged to permit a small amount of relative rotation between said member and shaft, friction means operable incident to said relative rotation when the torque is from driving member to driven member for rendering the rollers ineffective which are adapted to establish a drive when the torque is reversed, and other friction means under the control of the operator having a greater torque capacity than the first mentioned friction means adapted to maintain said rollers ineffective when the torque reverses.

ERNEST E. WEMP.